US005918528A

United States Patent [19]

Hays

[11] Patent Number: 5,918,528

[45] Date of Patent: Jul. 6, 1999

[54] FLUID CYLINDER FLOW CONTROL

[75] Inventor: E. Wayne Hays, Roberts, Ill.

[73] Assignee: Bimba Manufacturing Company, Monee, Ill.

[21] Appl. No.: 08/898,183

[22] Filed: Jul. 22, 1997

[51] Int. Cl.[6] .............................. F15B 11/08; B01D 53/02

[52] U.S. Cl. .................................. 91/443; 91/463; 92/143

[58] Field of Search ................................ 91/31, 443, 463; 92/143

[56] References Cited

U.S. PATENT DOCUMENTS

| | | | |
|---|---|---|---|
| 2,318,721 | 5/1943 | Siver | 92/143 X |
| 3,602,103 | 8/1971 | Powers | 91/443 |
| 4,377,183 | 3/1983 | Johansson et al. | 91/443 X |

FOREIGN PATENT DOCUMENTS

| | | | |
|---|---|---|---|
| 373871 | 6/1932 | United Kingdom | 91/31 |

*Primary Examiner*—John E. Ryznic
*Attorney, Agent, or Firm*—Lockwood, Alex, FitzGibbon & Cummings

[57] ABSTRACT

A fluid flow control for controlling the speed of a piston in a fluid power cylinder is disclosed in which the flow control is located within the confines of the cylinder and includes a rotatable disk having tearshaped slots for communication of the exhaust fluid through the disk and out of the cylinder through discharge ports. Rotation of the disk to selectively position greater or lesser width portions of the tearshaped slot relative to an exhaust discharge opening in the cylinder permits selective, variable adjustment and throttling of the exhaust fluid to control the speed of movement of the piston in the cylinder.

15 Claims, 1 Drawing Sheet

FLUID CYLINDER FLOW CONTROL

BACKGROUND AND SUMMARY OF INVENTION

The present invention is directed to a fluid cylinder flow control for controlling the speed at which a piston moves within the cylinder.

Fluid power cylinders have found widespread usage in many different applications. In most of these applications, the speed at which the cylinder operates, e.g. at which the piston moves relative to the cylinder, is controlled by a device generally referred to as a flow control. These flow controls typically operate to throttle the rate at which the fluid, whether it be gas or liquid, is exhausted from the cylinder when the cylinder and/or piston are moved relative to each other.

Typically, flow controls are provided at both ends of the cylinder to control the piston speed for movement in either direction. These flow controls may be either valve mounted, port mounted or mounted in line. The majority of them are port mounted in which a needle throttle valve or the like is mounted at the cylinder by threading it into a port on each of the cylinder end cap closures, and the needle valve may be adjusted to control the fluid flow rate. In the valve mounted flow controls the flow control is mounted remote from the cylinder at the fluid control valves which are utilized to control the operation of the cylinder, for example at an operator control station. In the in line mounted flow controls the flow controls are positioned in the conduit between the control valves and the cylinder and also relatively remote to the cylinder.

A principal disadvantage of the port mounted needle valve flow controls is their size. In the standard systems these flow controls may protrude from the cylinder end cap closures by as much as 3½–4 inches. Even where these flow controls are miniaturized, they still protrude from the cylinder by as much as 1–1¼ inches. However, as industry moves toward more and more miniaturization, these considerable protrusions are undesirable and unacceptable, particularly where the flow controls are on the cylinders as they are when they are port mounted.

Another potential disadvantage of the prior needle throttle valve flow controls, whether they be port, valve or in-line mounted, is that their range of adjustment is relatively narrow. For example, adjustment between 0–100 percent flow typically occurs in only 4–8 turns of the needle valve. It would be desirable if the flow controls, particularly where they have been miniaturized as is now possible to some extent, could be more precisely and accurately controlled.

In the present invention the aforementioned disadvantages are obviated. In the present invention, protrusion of the flow controls from the cylinder is eliminated thereby making possible the maximum degree of miniaturization of the cylinder. Moreover, the flow controls incorporating the principles of the present invention are capable of substantially greater and more precise adjustment of as much as 300–400 percent better than the flow controls of the prior art as discussed earlier. Where the flow controls of the prior art typically achieve their complete adjustment over the range of 0–100 percent flow in a mere 4–8 turns, the adjustment of the flow controls over the 0–100 percent range in the present invention may be accomplished in 18–20 turns. Accordingly, fine and accurate fluid control adjustment is substantially improved in the flow controls of the present invention. Finally, both of these important aforementioned advantages are possible at less expense and simpler construction than the prior flow control systems.

In one principal aspect of the present invention, a fluid flow control for the control of the flow of fluid from a fluid cylinder with a fluid operated reciprocating piston therein, includes a rotatable disk positionable in the cylinder. The disk has a thickness and is rotatable within the cylinder about an axis which is substantially parallel to the thickness of the disk. Means is provided for rotating the disk, and at least one arcuate slot which opens through the thickness of the disk communicates fluid through the disk. The slot is substantially concentric to the axis of rotation of the disk and has a width which varies between a maximum width at a first location spaced along the slot, and a minimum width at a second location spaced along the slot from the first location, wherein the flow of fluid can be varied by the rotation of the disk between the first and second locations.

In another principal aspect of the present invention, the means for rotating the disk comprises teeth on the disk and an adjusting element, preferably a screw, which engages the teeth and which rotates the disk upon movement of the adjusting element.

In still another principal aspect of the present invention, an opening is provided through the thickness of the disk at the axis of rotation of the disk for receiving the rod of the piston for reciprocation of the piston rod through the last mentioned opening.

In still another principal aspect of the present invention a pair of the slots are positioned on opposite sides of the axis of rotation of the disk and relative to each other to permit reversal of the direction in which disk faces.

In still another principal aspect of the present invention, the slot is tearshaped so that the aforementioned first and second locations are at opposite ends of the slot.

In still another principal aspect of the present invention, a passage is provided in at least one of the end cap closures of the cylinder and the passage has an opening in the cylinder housing for discharging fluid from the cylinder housing between the piston and one of the end cap closures of the cylinder when the piston moves toward that end cap closure. The slot is arcuate and overlies the opening to the passage whereby the flow of fluid is varied by the rotation of the disk between the first and second locations to control the discharge of fluid to the passage and the speed at which the piston moves toward the end cap closures.

These and other objects, features and advantages of the present invention will be more clearly understood upon consideration of the following detailed description of the preferred embodiment of the invention which will be described to follow.

BRIEF DESCRIPTION OF THE DRAWING

In the course of this description reference will frequently be made to the attached drawing in which.

DESCRIPTION OF THE PREFERRED EMBODIMENT

Figure 1:
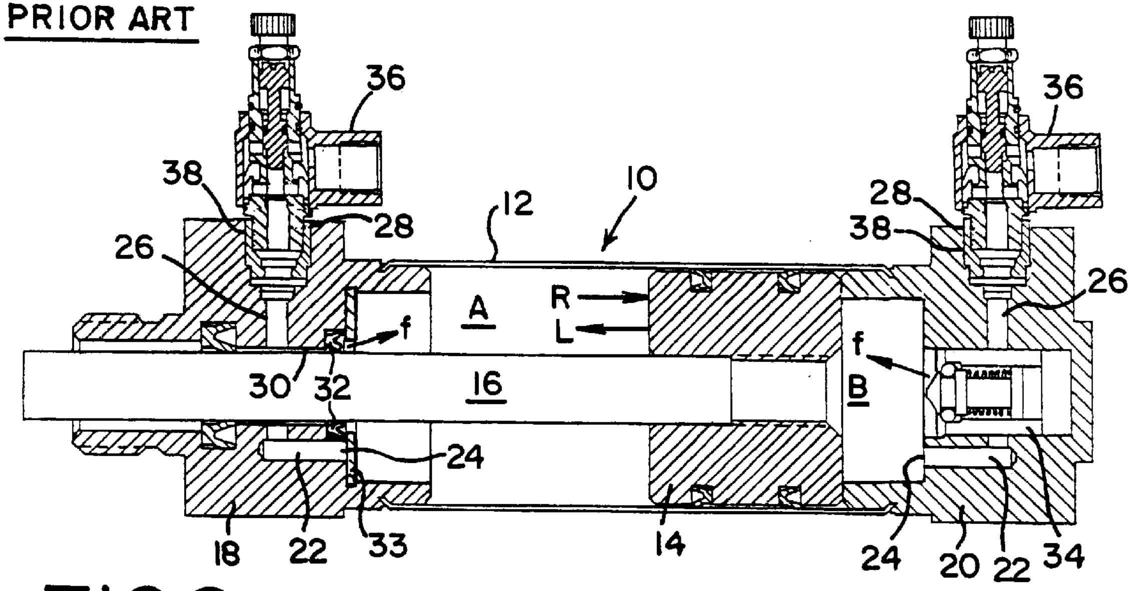
FIG.1 PRIOR ART
FIG. 1 is an overall, cross-sectioned side elevation view of a fluid power cylinder having port-mounted needle valve flow controls as are typical of the prior art.
Figure 2:
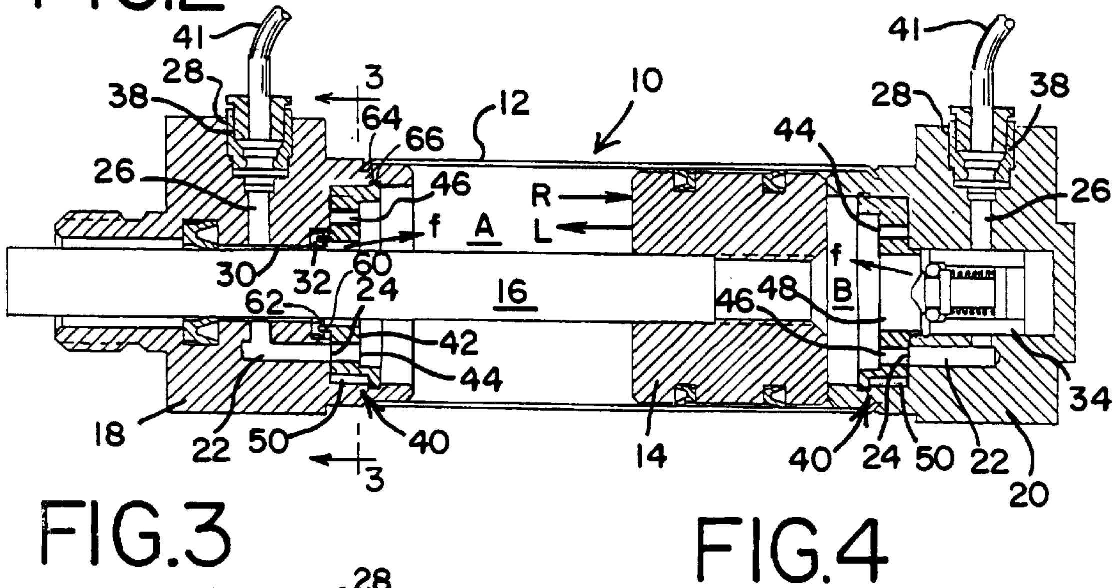
FIG. 2 is an overall cross-sectioned side elevation view of a fluid powered cylinder having a preferred embodiment of flow control incorporating the principles of the present invention.

Referring to FIGS. 1 and 2, a fluid powered cylinder assembly 10 is shown which includes the typical cylinder housing 12 of generally cylindrical shape and which has a piston 14 and piston rod 16 therein. A pair of end cap closures or heads 18 and 20 are provided at each end of the cylinder housing 12 to close off the housing as shown in FIGS. 1 and 2.

Each of the end cap closures 18 and 20 includes a passage 22 having an opening 24 which communicates with the interior of the cylinder housing 12 and a passage 26 which communicates with a port 28 on each of the end cap closures 18 and 22 as best seen in FIGS. 1 and 2. The passage 26 also communicates with an annular passage 30 in the end cap closure 18 to admit fluid under pressure as shown by the arrows f in FIGS. 1 and 2 around the piston rod 16 to the space A between the piston 14 and the end cap closure 18. Flow of fluid from space A in the opposite direction to the arrow f is precluded by a suitable check seal 32 as seen in FIGS. 1 and 2. In the fluid cylinder shown in FIG. 1, the seal 32 may be held in place by any one of a number of conventional means such as a spring ring 33.

Because the piston rod 16 extends through only one of the end cap closures 18, the configuration of the opposite end cap closure 20 may be somewhat different as shown in FIGS. 1 and 2. It may include a different form of check valve 34. However, the check valve 34 in end cap closure 20 likewise permits the introduction of fluid under pressure into space B as shown by the solid arrow f to the right in FIGS. 1 and 2, but closes to prevent flow in the reverse direction through the end cap 20.

With the exception of the passage 22 and its opening 24 and the various check mechanisms as shown, such as the seal 32 and check valve 34, the fluid power cylinder construction that has thus far been described is typical in general of the conventional fluid power cylinder constructions of the prior art. In such prior power cylinders, the piston 14 will move to the right and left, as shown in FIGS. 1 and 2 by the arrows R and L, respectively, between the end cap closures 18 and 20 depending upon through which port and which end cap closure high pressure fluid is admitted. If the high pressure fluid is admitted through the port 28 of the left end cap closure 18, the fluid will flow through passage 26, through the annular passage 30 about the piston rod 16, past the check seal 32 and into the space A as shown by the arrow f to drive the piston 14 to the right in the direction of arrow R. As the piston moves to the right, fluid is exhausted through opening 24, passages 22 and 26, and port 28 of end cap closure 20. Conversely, if high pressure fluid is introduced through port 28 in end cap closure 20, it will pass through the check valve 34 and in the direction of arrow f into space B to drive the piston 14 to the left in the direction of arrow L. As the piston moves to the left in the direction of arrow L, the fluid in space A will be exhausted through opening 24, passages 22 and 26 and port 28 of end cap closure 18.

As previously mentioned, in most functional applications of the power cylinders, flow controls are provided to control or throttle the fluid which is being exhausted through the respective ports 28 in order to control the speed of the piston 14 in the directions of the arrows R and/or L. Such flow controls typically take the form of port mounted needle throttle valves 36 as shown in each of the ports 28 in FIG. 1. These needle throttle valve flow controls 36 may either be threaded into the ports 28, or as shown in the drawings, fitted into the ports by way of a quick disconnect coupling 38. Also as previously mentioned, the conventional needle throttle valve port mounted flow controls 36 project for substantial and frequently unacceptable distances from the fluid power cylinder 10 as seen in FIG. 1. This space consuming projection is minimized and the precision of fluid flow adjustment is maximized in the present invention in which the flow control, generally 40 of the present invention, is positioned entirely within the fluid power cylinder 10 as shown in FIG. 2.

Figure 3:
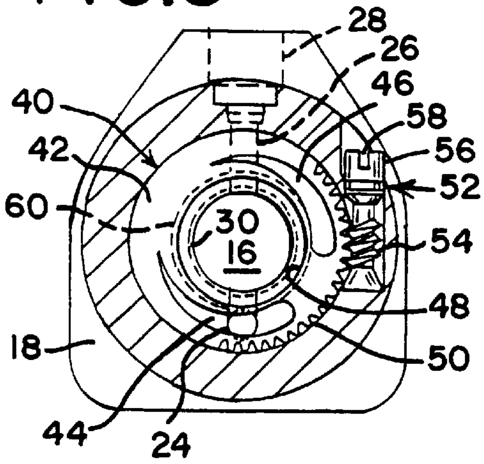
FIG. 3 is a cross-sectioned end elevation view of the fluid power cylinder and flow control of the present invention, as viewed substantially along lines 3—3 of the FIG. 2.
Figure 4:
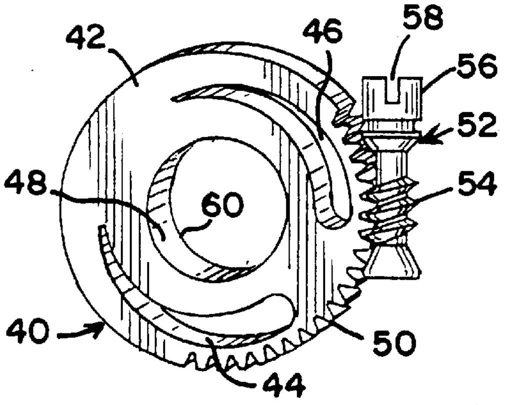
FIG. 4 is a perspective view of the flow control of the present invention removed from the cylinder to better show specific details.

Referring to FIG. 2, the ports 28 in each of the end cap closures 18 and 20 still include the quick disconnect coupling 38 as previously described, except that these couplings only act as couplings for fluid flow conduits 41. In the flow control 40 of present invention, the preferred embodiment of flow control comprises a flow control disk 42 which is preferably circular as shown in FIGS. 3 and 4, and which is positioned in the end cap closure so as to overlie the openings 24 to the passages 22 in the end cap closures 18 and 20. The disk 42 includes at least one and preferably two opening slots 44 and 46 respectively, which extend through the thickness of the disk from one of its faces to the other to communicate fluid through the disk to one of the openings 24 when a slot is aligned with that opening. As shown, only one of the slots 44 or 46 of a given disk 42 is functional for any given disk installation. The second slot is provided only for the purpose of permitting reversal of the disks so that a single stock disk of singular construction may be employed at either end of the cylinder. For reversal and use at the other end of the cylinder all that need be done is to rotate the disk 42 as shown in FIGS. 3 and 4 180° and reverse the direction in which the disk faces. As will be seen in FIG. 2, when this is done the bottom slot 44 to the left in FIG. 2 which is functionally aligned with the opening 24 in the left end cap closure 18 will become the top non-functional slot when reversed, and the top previously non-functional slot 46 will become functional aligning with the opening 24 in end cap closure 20.

The slots 44 and 46 as shown are generally concentric to the axis of movement of the piston 14 and its piston rod 16. An opening 48 is provided through the center of the disk 42. The opening 48 is large enough to accommodate the piston rod 16 for reciprocation therethrough and also to permit the introduction of fluid around the piston rod as shown to the left in FIG. 2 by the arrow f into the space A when the piston 14 is to move to the right in the direction of the arrow R.

As best seen in FIGS. 3 and 4, the slots 44 and 46 are tearshaped so that the width across the openings is a maximum at one location adjacent one end of the slot, and a minimum at a second location adjacent the other end. Because of this variation in width, it will be seen that when the disk 42 is rotated about an axis parallel to its thickness and/or parallel to the direction of movement of the piston rod 16, the slot will cover or uncover more or less of the opening 24 in the exhaust passage 22 of its end cap closure, and thereby will variably throttle the flow of the fluid which is being exhausted from the spaces A or B through the openings 24 depending on the degree to which the disk 42 has been rotatably adjusted. This flow control will result in control of the speed at which the piston 14 will move either to the right or left as shown by the arrows R and L in FIG. 2 where a disk is positioned at each end of the cylinder.

In order to accomplish the rotational adjustment of the flow control disk 42, the disk is preferably formed with a segment of gear teeth 50, as best seen in FIGS. 3 and 4. An adjusting screw 52 is positioned in the end cap closure 18 and with its screw threads 54 positioned in engagement with the teeth 50. An adjustment head 56 on the screw is exposed to the exterior of the end cap closure 18 as viewed in FIG. 3 to permit manual adjustment and rotation of the flow control disk 42. The head 56 may include a slot 58 for this adjustment purpose.

Although not absolutely necessary to the function and purpose of the present invention, one side of the disk 42 also preferably includes a short cylindrical flange 60 as shown in the drawings. Flange 60 has the purpose of being positioned in an annular groove 62 of the check seal 32 to maintain it in position longitudinally relative to the cylinder.

The disk 42 may be formed of anyone of a wide selection of durable materials such as Delrin or PTFE. The disk 42 is positioned in place in any suitable manner to keep it from moving in a direction parallel to the movement of the piston rod 16 during operation of the cylinder. One preferred manner of such positioning as shown in the drawings is a snap-fit where the circumferential edge 64 of the disk 42 snap fits into an annular groove 66 in the end cap closure 18.

Although it is believed from the foregoing description of the invention that its operation will be apparent to those skilled in the art, a brief description of the operation and function follows.

Initially it will be assumed that the piston 14 is in the far right position, as shown in FIG. 2. In order to move the piston to the left as shown by the arrow L, fluid under pressure is admitted to the conduit 41, port 28 and passage 26 of the end cap closure 20, and passes through the check valve 34 and into the space B through the central opening 48 in the right hand disk 42, and as shown by the arrow f to the right in FIG. 2. This will urge the piston 14 to the left in the direction of the arrow L. As the piston 14 moves to the left, the fluid present in space A will be exhausted through the bottom slot 44 in the left disk 42, through the opening 24 and exhaust passage 22, through passage 26 and port 28 and out through conduit 41 in end cap closure 18. Depending upon the degree to which the left flow control disk 42 has been rotated, more or less of the opening 24 will be exposed to the exhaust fluid as shown in FIG. 3. Thus, if the slot 44 has been rotated to fully expose the opening 24 to the space A, little if any throttling of the exhaust fluid will occur and the speed of the piston 14 to the left as shown by the arrow L will be at its maximum. Conversely, if the slot 44 has been rotated counter—clockwise from the position shown in FIG. 3 so that only a near minimum width of the slot overlies the opening 24, the exhaust of fluid from space A will be substantially throttled to greatly slow the speed of the piston 14 to the left as viewed by the arrow L.

When the piston 14 is to be moved to the right to assume its position shown in FIG. 2, the previously described operation is substantially reversed, except to the extent that the incoming fluid through end cap closure 18 will pass between the piston rod 16 through the annular passage 30 and past the check seal 32 as shown by the arrow f in FIG. 2.

From the foregoing it will be appreciated that because the flow control disk 42 may be enclosed entirely within the confines of the cylinder 10, the size and exterior profile of the assembly may be substantially reduced. In addition, the tearshaped design of the slots 44 and 46 and their positioning in the rotatable disk 42 permits extremely precise and accurate adjustment of the fluid flow of a magnitude which is a number of times greater than the precision of adjustment which was typically previously possible with the prior needle throttle valve flow controls. Moreover and significantly, both of these desirable advantages can be achieved in the present invention while at the same time reducing the expense and complexity of the prior port mounted flow controls.

Although the term "fluid" as employed herein is preferably a gas or air, it will be appreciated that it may also include a liquid.

It also will be understood that the preferred embodiment of the present invention which has been described is merely illustrative of the principles of the present invention. Numerous modifications may be made by those skilled in the art without departing from the true spirit and scope of the invention.

I claim:

1. A fluid flow control for the control of the flow of fluid from a fluid cylinder with a fluid operated reciprocating piston therein, the fluid flow control comprising a rotatable disk positionable in the cylinder, said disk having a thickness and being rotatable within the cylinder about an axis which is substantially parallel to the thickness of the disk;

means for rotating said disk;

at least one arcuate slot which opens through the thickness of the disk for communicating fluid through the disk, said slot being substantially concentric to the axis of rotation of the disk and having a width which varies between a maximum width at a first location spaced along the slot, and a minimum width at a second location spaced along said slot from said first location, whereby the flow of fluid can be varied by the rotation of the disk between said first and second locations.

2. The flow control of claim 1, wherein said means for rotating the disk comprises teeth on said disk and an adjusting element which engages said teeth and which rotates said disk upon movement of the adjusting element.

3. The flow control of claim 2, wherein said adjusting element is a screw.

4. The flow control of claim 1, including an opening through the thickness of said disk at the axis of rotation of the disk for receiving the rod of the piston for reciprocation of the piston rod through said opening.

5. The flow control of claim 1, including a pair of said slots on opposite sides of the axis of rotation and positioned relative to each other to permit reversal of the direction in which disk faces.

6. The flow control of claim 1, wherein said slot is tearshaped so that said first and second locations are at opposite ends of said slot.

7. The flow control of claim 1, wherein said means for rotating said disk comprises teeth on said disk and an adjusting element which engages said teeth and which rotates said disk upon movement of the adjusting element; an opening through the thickness of said disk at the axis of rotation of the disk for receiving the rod of the piston for reciprocation of the piston rod through said opening; a pair of said slots on opposite sides of the axis of rotation and positioned relative to each other to permit reversal of the direction in which the disk faces; and wherein said slots are tearshaped so that said first and second locations are at opposite ends of said slots.

8. A fluid cylinder comprising:

a cylinder housing;

a pair of end cap closures one on each end of said cylinder housing and spaced from each other;

a piston in said cylinder housing, said piston being reciprocally movable along an elongate axis in said cylinder housing and toward and away from said respective end cap closures;

a passage in at least one of said end cap closures, said passage having an opening in the cylinder housing for discharging fluid from the cylinder housing between said piston and said one of said end cap closures when said piston moves toward said one of said end cap closures;

a fluid control for the control of the flow of the fluid which is being discharged through said passage and said opening, said fluid control including;

a rotatable disk in the cylinder housing adjacent said opening and between said opening and said piston, said disk being rotatable within the cylinder housing about an axis which is substantially parallel to said elongate axis;

means for rotating said disk in said cylinder housing; and at least one arcuate slot which opens through said disk, said slot being substantially concentric to the axis of rotation of the disk, overlying said opening and having a width which varies between a maximum width at a first location along the slot, and a minimum width at a second location spaced along said slot from said first location, whereby the flow of fluid is varied by the rotation of the disk between the first and second locations to variably control the discharge of fluid to said passage and the speed at which said piston moves toward said one of said end cap closures.

9. The cylinder of claim 8, wherein said means for rotating the disk comprises teeth on said disk and an adjusting element which engages said teeth and which rotates said disk upon movement of the adjusting element.

10. The cylinder of claim 9, wherein said adjusting element is a screw.

11. The cylinder of claim 8, including a piston rod on said piston, and an opening through the thickness of said disk which receives said piston rod for reciprocation of the piston rod through said opening through said disk.

12. The cylinder of claim 8, including a pair of said slots on opposite sides of the axis of rotation of said disk, said slots being positioned relative to each other to permit reversal of the direction in which the disk faces for positioning at either of said end closures.

13. The cylinder of claim 8, wherein said slot is tear-shaped so that said first and second locations are at opposite ends of said slot.

14. The cylinder of claim 8, wherein said means for rotating the disk comprises teeth on said disk and an adjusting element which engages said teeth and which rotates said disk upon movement of the adjusting element; a piston rod on said piston; an opening through the thickness of said disk which receives said piston rod for reciprocation of said piston rod through said opening through said disk; a pair of said slots on opposite sides of the axis of rotation of said disk, said slots being positioned relative to each other to permit reversal of the direction in which the disk faces for positioning at either of said end cap closures; and wherein said slots are tearshaped so that said first and second locations are at opposite ends of said slots.

15. The cylinder of claim 8, including a pair of said flow controls one at each of said end cap closures to variably control the speed at which said piston moves toward either of said end cap closures.

* * * * *